US005710613A

United States Patent [19]
Hughes

[11] Patent Number: 5,710,613
[45] Date of Patent: Jan. 20, 1998

[54] MODIFIED VISION ARTIST'S GLASSES

[76] Inventor: S. Grant Hughes, 5409 Lodi St., San Diego, Calif. 92117

[21] Appl. No.: 658,359

[22] Filed: Jun. 5, 1996

[51] Int. Cl.$^6$ .................................................. G02C 7/16
[52] U.S. Cl. .................................................. 351/45; 351/46
[58] Field of Search ........................... 351/45, 46, 44, 351/47; 2/448, 449, 451, 450

[56] References Cited

U.S. PATENT DOCUMENTS 4,542,964  9/1985  Gilsons et al. ........................... 351/45

*Primary Examiner*—Hung X. Dang
*Attorney, Agent, or Firm*—Frank G. Morkunas

[57] ABSTRACT

Artist's eyeglasses having a clear section in the lens and a diffused section in the same lens suited for viewing an object to be painted or drawn through the diffused section and seeing that object in its most basic shape, shifting one's gaze away from the object to the painting medium (canvas) and simultaneously shifting one's eyes to the clear section while the basic shape is fresh in the mind, and transferring that basic shape onto canvass. The glasses also have adjustable shading and lighting shields over the frame and temple arms to permit the artist to vary the shading and lighting at the point of perception as best suited for artistic needs and purposes.

17 Claims, 1 Drawing Sheet

MODIFIED VISION ARTIST'S GLASSES

BACKGROUND OF THE INVENTION

This invention relates to eyeglasses, specifically to be worn by artists who paint in a representational manner. These glasses better enable them to see a more simplified view of their subject, allowing them to more easily create a painting with a strong sense of light and if desired a more impressionistic look.

In representational art, before the artist begins to apply paint he must "assess the lighting structure". This is his interpretation of the light and shadow masses. The artist must then transfer that structure he sees to his canvas. In determining the basic lighting and composition of a subject fine definition and detail is unnecessary, unwanted and a distraction. If the lighting structure is improperly interpreted when viewed, the final painting will be less than desired. The lighting structure is the foundation of the painting and the foundation, as in most practices is the single most important determiner of the end result. Once a proper foundation is established, the details follow and integrate smoothly.

The best way to evaluate the lighting structure is to view the subject in a diffused but not out of focus state. Generally, artists are taught to squint when viewing their subject in order to better see the lighting structure because details and texture. are harder to distinguish. Although squinting has been taught and used as a technique for simplifying one's vision for probably centuries, it has some major drawbacks. Squinting as a seeing technique is somewhat of a paradox because one is trying to visually study a scene while trying to see less clearly. Squinting is somewhat mentally and physically straining. Art teachers claim you can identify a long time painter by the crow's feet around his eyes caused by years of squinting. These factors contribute to the fact that artists either forget to squint when beginning their painting or stop squinting at too early a stage of their painting.

Some artists have been known to use prescription glasses which vary several diopters from their normal corrected vision prescription in an attempt to see a more simplified subject. They are, however, creating an out of focus view, not a diffused view. The two are not synonymous. A diffused view tends to eliminate detail in such a way that one sees only light and shadow masses; with an out of focus view one still sees out of focus details. Also, viewing a subject through a pair of glasses with an incorrect prescription may induce eyestrain and might be considered harmful to one's vision.

In some cases, an artist may also wish to better control lighting and shading from his visual perspective; that is, to limit or to vary the lighting and shading directly available to his eyes. Squinting cannot accommodate this degree of flexibility associated with artistic interpretation and creation; nor can the following prior art attempts at establishing the foundation.

Not until the creation of the present invention has anyone devised a simple, effective and safe solution for the artist's need to simplify his seeing.

SUMMARY OF THE INVENTION

The above-noted problems, among others, are overcome by the present invention. This invention provides a fine artist with simple, easy-to-use and safe means of viewing an object and seeing it without the definition and detail which is necessary to establish a foundational base for his painting. It also provides an artist with greater control of lighting and shading when viewing an object and assessing its situation by means of adjustable shielding devices on the frame and temple arms of the glasses. In addition to varying the lighting and shading, this provides a distraction barrier for the artist thereby allowing the artist to remain focused on the object and artistic product.

Accordingly, several objects and advantages of this invention are to:

facilitate consistency in establishing an artistic foundation;

provide for continuity of artistic flow from assessment of the situation, to its interpretation, to its transfer onto a suitable medium;

control lighting and shading at the point of perception;

provide greater flexibility in establishing varying degrees of diffusion of details when viewing an object;

provide a barrier to distraction; and permit the viewing of an object in an artistically attuned fashion for a protracted length of time without physical discomfort.

Other objects and features of the invention will become apparent as the drawings which follow are understood by reading the corresponding description thereof.

BRIEF DESCRIPTION OF THE DRAWING FIGURES

DETAILED DESCRIPTION OF THE PREFERRED EMBODIMENTS

Figure 1:
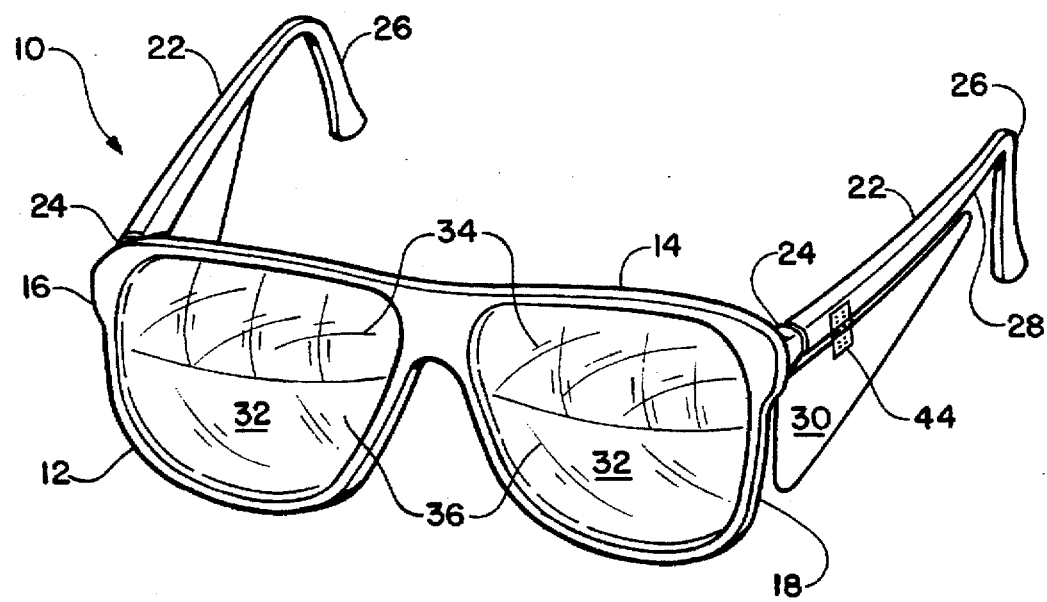
FIG. 1 is a perspective view of the artist's glasses.
Figure 4:
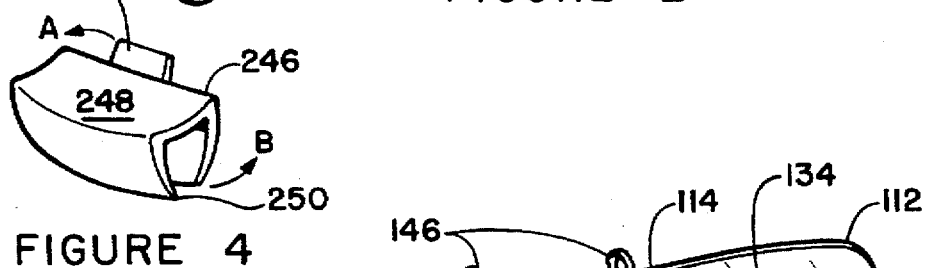
FIG. 4 is an attaching device used in conjunction with the glasses shown in FIG. 3.
Figure 3:
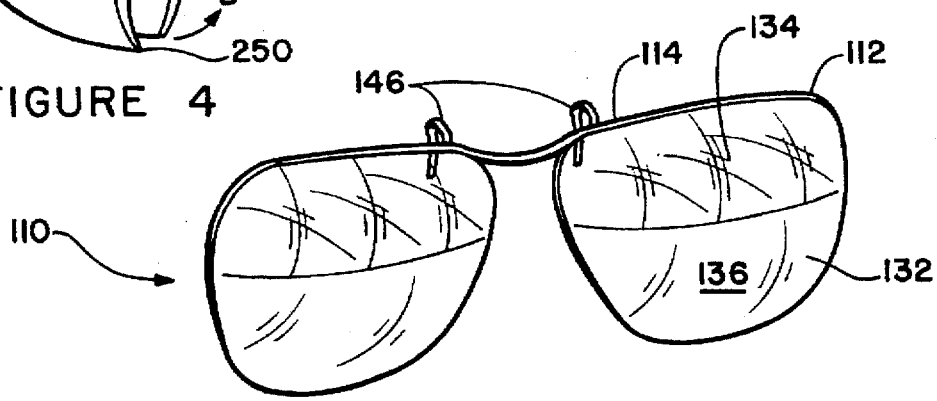
FIG. 3 is another embodiment of the artist's glasses.

FIG. 1 shows the glasses 10 having frame 12, retaining means 22 attached thereto by an attachment means such as retainer attachment 40, and lens 32 contained within frame 12. Lens 32 may be made of any suitable material; glass and plastic being the most common. Retaining means 22 can be any conventional type of retainer suited for the intended purpose such as temple arms extending from frame 10. In the case of glasses without temple arms, the attaching means may be comprised of biased retaining clips 246 or biased retaining pins 146 on frame 10 as seen in FIGS. 3 and 4. In the case of those glasses having temple arms, retainer attachment 40 can be any conventional attachment medium suited for the intended purpose such as a hinge, hinge-type mechanism, or pivot, or spring loaded, which is common in most glasses. Frame 12 has top 14, first side 16, and second side 18. Retaining means 22 has front 24, back 26, and bottom 28. Lens 32 has first section 34 and second section 36.

In this embodiment lens first section 34 is diffused providing a modified perception of the objects viewed, while lens second section 36 is clear. In this bifocal-type embodiment, an artist can view his subject through first section 34, in a modified vision form to obtain the foundational aspect desired and immediately transfer that view onto canvass while shifting his eyes toward the clear second section 36. There is no loss in visual appearance or perception between subject viewed and interpreted onto canvass. The movement between subject and canvass is so close in time, seemingly simultaneous, that no additional distortion results and immediacy of memory for proper interpretation and transfer onto canvass is the result. Whether diffused sections are horizontally or vertically adjacent to one another, on top, on the bottom, on the right side, or on the left side is immaterial to the functionality of the glasses. Such can be varyingly placed as suited to the personality, professional preference, and needs of the artists.

The degree of diffusion is important to the proper functionality of this invention and plays a pivotal role. The purpose of the diffusion is not so much as to refract the image but to diffuse it—not to put it out of focus—without physical harm or discomfort. Diffusion or clarity is important to this invention and is difficult to quantify. The object must be seen in its entirety but with its fine line definitions less sharp and less detailed but nonetheless completely distinguishable in form. The best means for quantifying this diffusion is by using the Mold Finish Comparison Kit as it relates to polishing which is published by The Society of Plastics Manufacturing Engineers. It is referred to as the SPI Index or SPI Grade. To that end, and in the interests of administrative economy, that kit is hereby incorporated by reference into this application and specification. SPI Grades range from Grade 1 (most clear) to Grade 6 (virtually obscured). Generally molds are made from this kit, but for diffusion quantification purposes and as a 'diffusion guide', they are used herein. The grade to which a mold is finished or polished determines the degree of clarity or diffusion. For example, using the Mold Kit as a guide, Grade 1 polishing encompasses use of 8000 grit, 3 micron grit size, on a suitable polishing medium on the mold. This fine degree of polishing results in a clear, completely transparent, finish.

Grade 2 entails use of 1200 grit, 15 micron grit size, on a suitable medium on the mold. This less fine degree of polishing results in a less than clear, diffused finish which permits passage of light without appreciable scattering so that bodies beyond are visible in a modified form. Grade 3 involves use of 320 grit emery cloth, which is a wet/dry type of polishing on the mold. Grades 2 and 3 yield somewhat diaphanous states; i.e., a vision state between absolutely transparent and substantially less than completely translucent since a completely translucent state permits passage of light but without permitting the viewer to be able to identify objects. The degree of clarity diminishes while the degree of diffusion increases. Grade 4 entails polishing with a 280 grit stone; Grade 5 entails a 240 grit dry blast at 100 psi at a distance of about 5 inches; and Grade 6 involves a 24 grit dry blast at 100 psi at a distance of about 3 inches. The degree of diffusion increases markedly with each grade such that, at Grade 6, clarity is virtually non-existent rendering the lens translucent and permitting passage of light so that objects beyond cannot be seen.

Any method of finishing (polishing) a mold, such as described above or by bead blasting or sand blasting or the like, may be utilized. The degree of diffusion is what is important for the artist's glasses. Using the Mold Kit as described above, Grades 1 through 4 generally require direct contact abrading, stroking, or polishing for as long as necessary to attain a consistent texture. For grade 1 and 2, such could take up to 12 hours. Grades 3 through 6 range from two minutes up to one hour. Key here is a consistent texture based on the Grade sought. Once the texture of the Grade, as quantified above, is attained, regardless of how attained, additional finishing does no more to the mold or the final product. Lenses may be made of plastic or glass or any other suitable substance. The degree of diffusion is what is important, not the material from which the lenses are made.

To make the glasses out of plastic, first a mold is made for the glasses. The mold is polished to a Grade 1 finish. Next a section of the clear lens is masked and the section to be textured to a diffused state remains exposed. The exposed section is subjected to texturing to Grades 2, 3, 4, 5, or 6 depending on the degree of diffusion desired. Generally, two minutes of blasting is sufficient to achieve Grade 5 or Grade 6. A set of lenses are made from the mold by injecting plastic into the mold and waiting for the plastic to cure. Grades 2 through 5 result in usable artist's glasses. Typically, Grades 2 through 4 yield a better product. Grades 2 through 3 seem to be best suited for the intended purpose.

Lenses also may be manufactured obtaining a pair of glasses or spectacles having clear-vision or nearly clear-vision lenses, masking off a section of the lens, placing a diffusing substance on the non-masked section of the lens, and removing the masking after the diffusing substance has adhered to the unmasked section. Diffusing substances suited for this purpose include sprays, both permanent and temporary. Typical sprays include clear acrylics and art fixatives. The diffusing substance can be sprayed on, brushed on, or poured on in one or more coats. Although one coat is generally sufficient for some diffusion, more than one coat may be necessary depending on the degree of diffusion desired. Two coats provides a good diffusion effect; three coats an even better diffusion effect. The more coats applied, the greater the diffusion effect. The key is attaining the desired grade of diffusion as described above. Applying this method to ordinary clear-vision lenses will accomplish the purpose of the artist's glasses associated with this invention.

Figure 2:
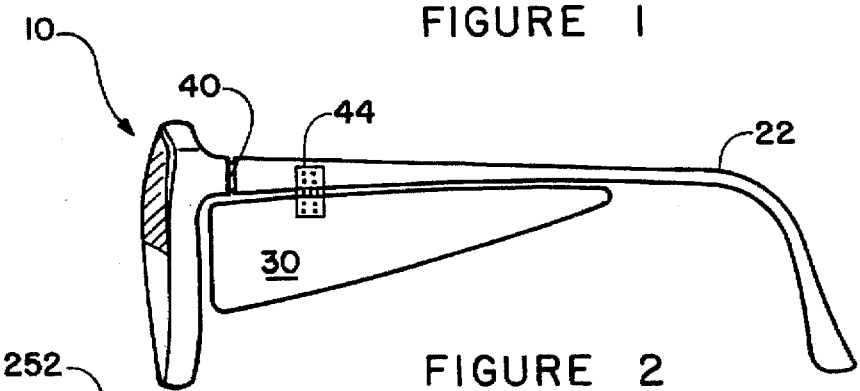
FIG. 2 is a side view of the artist's glasses.

FIG. 2 shows glasses 10 having retainer shield 30 extend downward from temple arms retaining means 22. Retainer shield 30 runs along retaining means bottom 28 from retaining means front 24 to nearly the back 26. Retainer shield 30 may be moveable or fixed. Retainer shield 30 may extend from retaining means 22 either downwardly or upwardly. Retainer shield 30 can be straight or somewhat curved and flexible such that when the glasses are worn, retainer shield 30 provides a peripheral distraction barrier for the artist. Retaining shield 30 also can be straight, curved, multi-curved, fully or partially contoured uni-angled, or multi-angled in structure. By such flexibility of structure, the glasses can be made need-specific and will accommodate any variation in style any single artist employs.

Retainer shield 30 may be permanently affixed to retaining means 22 or may be a separate unit moveably affixed to retaining means 22 by pivotable retainer shield attachment 44. Retainer shield attachment 44 can be any conventional hinge or pivot-type device suited for the intended purpose. It can be a smoothly moving or pivoting mechanism or frictional or gradational in movement by used of detents, lans and grooves, channel-locking, and the like, such that when moved, it can firmly hold its position and angle. By such position holding, retainer shield attachment 44 can be manually adjusted to suit the artist's needs for lighting, shadowing, and shading.

FIG. 3 shows glasses 110 without temple arms as the retaining means. Glasses 110 have lens 132 having at least two sections; a clear section first section 134 and a diffused second section 136. It also shows retaining means and attachment means in this embodiment to be an attaching device comprised of biased retaining pins 146 connected to frame 110 by a first portion of retaining pin. A second portion of retaining pin 146 extends from the first portion in such a fashion as to create an opening. The retaining pins 146 are biasedly affixed to frame 110 such that they permit the frame 110 to be inserted over a suitable object (not shown; such as the frame on a pair of regular glasses)

through the opening created. When the second portion of the retaining pin 146 is pressed over this regular glass frame, my glasses 110 are securely held onto that object.

Referring to FIG. 4, retaining means and attachment means may also consist of an attaching device comprised of a biased retaining clip 246 in place of retaining pins 146. As can be seen, retaining clip has a closed end 248, an open end 250, and a protrusion 252. With retaining clip 246 attached to the artist glass frame, when protrusion 252 is pushed in the direction of arrow A it is engaged and causes open end 250 to move in the direction of arrow B and open. The artist's glasses may thereby be slipped onto a suitable object; such as a pair of standard glasses and held securely in place.

While specific embodiments have been shown and fully explained above for the purpose of illustration, it should be understood that many other uses will be found for the instant invention disclosure and many alterations, modifications, and substitutions may be made thereto without departing from the spirit and scope of the invention as defined by the appended claims. Such are intended to be included within the scope of the invention. Accordingly, the scope of the invention should be determined not by the embodiemnt[s] illustrated, but by the appended claims and their legal equivalents.

The invention claimed is:

1. Modified vision artist glasses for use by an artist in viewing an object to be painted, said glasses comprising an eyeglass frame having a first side, a second side, and a top;

a retaining means attached to said frame;

at least one lens attached to said frame, said lens further comprising at least two sections, a first section being substantially diffused yet not blocked to thereby permit objects beyond to be seen in their entirety and a second section being substantially clear, whereby when viewing an object through the diffused section, an artist sees the object in its most basic form, without definition and detail, and, while fresh in the artist's mind, the artist shifts view to a painting medium, such as a canvass, and simultaneously views the canvass through the clear section, thereby transferring the object as modified onto the canvass.

2. The invention as described in claim 1 wherein said retaining means comprises a front, a back, and a bottom, said front attaching to said frame, said retaining means further having a retainer shield on said bottom extending downward therefrom.

3. The invention as described in claim 2 wherein said retainer shield is adjustably attached to said retaining means by a retainer shield attachment.

4. The invention as described in claim 1 wherein said diffused section comprises a section diffused to a grade reflective of having been made from between a mold polished by a polisher having between about a 1200 grit, 15 micron grit size to a mold polished by a polisher having about a 240 grit dry blast at about 100 psi.

5. The invention as described in claim 1 wherein said diffused section comprises a section diffused to a grade reflective of having been made from between a mold polished by a polisher having about a 1200 grit, 15 micron grit size to a mold polished by a polisher having about a 280 grit stone.

6. The invention as described in claim 1 wherein said diffused section comprises a section diffused to a grade reflective of having been made from between a mold polished by a polisher having about a 1200 grit, 15 micron grit size to a mold polished by a polisher having about 320 grit emery cloth.

7. The invention as described in claim 1 wherein said retaining means comprises an attaching device connected to said frame.

8. The invention as described in claim 7 wherein said attaching device comprises at least one retaining pin, said retaining pin having a first portion attached to said frame and a second portion extending from said first portion, said second portion having a biased opening into which an object may be inserted and said frame may be securely held onto said object thereby.

9. The invention as described in claim 7 wherein said attaching device comprises at least one retaining clip, said retaining clip having an open end and a closed end, each in biased cooperation with one another, said closed end being attached to said frame and further having a protrusion which when said protrusion is engaged causes the open end to open and permit insertion of said attaching device onto an object such that said frame will be securely held onto said object thereby.

10. Modified vision artist glasses for use by an artist in viewing an object to be painted, said glasses comprising an eyeglass frame having a first side, a second side, and a top;

a retaining means attached to said frame, said retaining means comprising an attaching device having at least one retaining clip, said retaining clip having an open end and a closed end, each in biased cooperation with one another, said closed end being attached to said frame and further having a protrusion which when said protrusion is engaged causes the open end to open and permit insertion of said attaching device onto an object such that said frame will be securely held onto said object thereby;

at least one lens attached to said frame, said lens further comprising at least two sections, a first section being substantially diffused yet not blocked to thereby permit objects beyond to be seen in their entirety and a second section being substantially clear, whereby when viewing an object through the diffused section, an artist sees the object in its most basic form, without definition and detail, and, while fresh in the artist's mind, the artist shifts view to a painting medium, such as a canvass, and simultaneously views the canvass through the clear section, thereby transferring the object as modified onto the canvass.

11. The invention as described in claim 10 wherein said diffused section comprises a section diffused to a grade reflective of having been made from between a mold polished by a polisher having about a 1200 grit, 15 micron grit size to mold polished by a polisher having about a 240 grit dry blast at about 100 psi.

12. The invention as described in claim 10 wherein said diffused section comprises a section diffused to a grade reflective of having been made from between a mold polished by a polisher having about a 1200 grit, 15 micron grit size to a mold polished by a polisher having about a 280 grit stone.

13. The invention as described in claim 10 wherein said diffused section comprises a section diffused to a grade reflective of having been made from between a mold polished by a polisher having about a 1200 grit, 15 micron grit size to a mold polished by a polisher having about a 320 grit emery cloth.

14. Modified vision artist glasses for use by an artist in viewing an object to be painted, said glasses comprising an eyeglass frame having a first side, a second side, and a top;

a retaining means attached to said frame, said retaining means comprising an attachment device having at least one retaining pin, said retaining pin having a first portion connected to said frame and a second portion extending therefrom, said second portion further having a biased opening into which an object may be inserted and said frame may be securely held onto said object thereby;

at least one lens attached to said frame, said lens further comprising at least two sections, a first section being substantially diffused yet not blocked to thereby permit objects beyond to be seen in their entirety and a second section being substantially clear, whereby when viewing an object through the diffused section, an artist sees the object in its most basic form, without definition and detail, and, while fresh in the artist's mind, the artist shifts view to a painting medium, such as a canvass, and simultaneously views the canvass through the clear section, thereby transferring the object as modified onto the canvass.

15. The invention as described in claim 14 wherein said diffused section comprises a section diffused to a grade reflective of having been made from between a mold polished by a polisher having about a 1200 grit, 15 micron grit size to a mold polished by a polisher having about a 240 grit dry blast at about 100 psi.

16. The invention as described in claim 14 wherein said diffused section comprises a section diffused to a grade reflective of having been made from between a mold polished by a polisher having about a 1200 grit, 15 micron grit size to a mold polished by a polisher having about a 280 grit stone.

17. The invention as described in claim 14 wherein said diffused section comprises a section diffused to a grade reflective of having been made from between a mold polished by a polisher having about a 1200 grit, 15 micron grit size to a mold polished by a polisher having about a 320 grit emery cloth.

* * * * *